United States Patent
Seino

(10) Patent No.: US 12,326,594 B2
(45) Date of Patent: Jun. 10, 2025

(54) OPTICAL CONNECTOR AND METHOD OF MANUFACTURING OPTICAL CONNECTOR

(71) Applicant: Fujikura Ltd., Tokyo (JP)

(72) Inventor: Ririka Seino, Sakura (JP)

(73) Assignee: Fujikura Ltd., Tokyo (JP)

(*) Notice: Subject to any disclaimer, the term of this patent is extended or adjusted under 35 U.S.C. 154(b) by 25 days.

(21) Appl. No.: 18/024,643

(22) PCT Filed: Dec. 11, 2020

(86) PCT No.: PCT/JP2020/046366
§ 371 (c)(1),
(2) Date: Mar. 3, 2023

(87) PCT Pub. No.: WO2022/049792
PCT Pub. Date: Mar. 10, 2022

(65) Prior Publication Data
US 2023/0314713 A1    Oct. 5, 2023

(30) Foreign Application Priority Data

Sep. 7, 2020   (JP) ................................ 2020-149707

(51) Int. Cl.
G02B 6/255   (2006.01)
(52) U.S. Cl.
CPC ......... *G02B 6/2558* (2013.01); *G02B 6/2551* (2013.01); *G02B 6/2556* (2013.01)
(58) Field of Classification Search
CPC .. G02B 6/2558; G02B 6/2551; G02B 6/2556; G02B 6/3887; G02B 6/3846; G02B 6/255; G02B 6/3826
See application file for complete search history.

(56) References Cited

U.S. PATENT DOCUMENTS

| | | | | |
|---|---|---|---|---|
| 5,085,494 | A | * | 2/1992 | Wesson ................ G02B 6/3801 385/98 |
| 6,830,382 | B1 | * | 12/2004 | Deane .................. G02B 6/4292 385/88 |
| 9,798,089 | B2 | * | 10/2017 | Isenhour .............. G02B 6/4284 |

(Continued)

FOREIGN PATENT DOCUMENTS

| | | |
|---|---|---|
| JP | 2008191410 A | 8/2008 |
| JP | 2008225461 A | 9/2008 |

(Continued)

OTHER PUBLICATIONS

International Search Report issued in corresponding International Application No. PCT/JP2020/046366; mailed Mar. 2, 2021 (5 pages).

*Primary Examiner* — Ryan A Lepisto
*Assistant Examiner* — Erin D Chiem
(74) *Attorney, Agent, or Firm* — Osha Bergman Watanabe & Burton LLP

(57) ABSTRACT

An optical connector includes: a ferrule that holds an end part of a fiber; and a holding member including: a holding part that slidably holds the ferrule; a fixing part through which the fiber extending from the ferrule is inserted and to which a sleeve for protecting a fusion splice point between the fiber and an optical fiber is fixed; and a housing part that houses the fiber between the holding part and the fixing part when the fiber is bent and the ferrule moves rearward of the housing part.

9 Claims, 11 Drawing Sheets

(56) References Cited

U.S. PATENT DOCUMENTS

| | | | |
|---|---|---|---|
| 2010/0220959 A1* | 9/2010 | Hoffmann | G02B 6/4292 |
| | | | 385/60 |
| 2016/0223764 A1* | 8/2016 | Cervantes | G02B 6/245 |
| 2017/0059785 A1* | 3/2017 | Smith | G02B 6/3839 |
| 2018/0267243 A1* | 9/2018 | Nhep | G02B 6/3889 |
| 2019/0101709 A1 | 4/2019 | Wang | |

FOREIGN PATENT DOCUMENTS

| | | |
|---|---|---|
| JP | 2010217416 A | 9/2010 |
| JP | 2013529798 A | 7/2013 |
| JP | 2019086576 A | 6/2019 |
| JP | 2020034638 A | 3/2020 |
| JP | 2020056911 A | 4/2020 |
| WO | 2008059843 A1 | 5/2008 |

\* cited by examiner

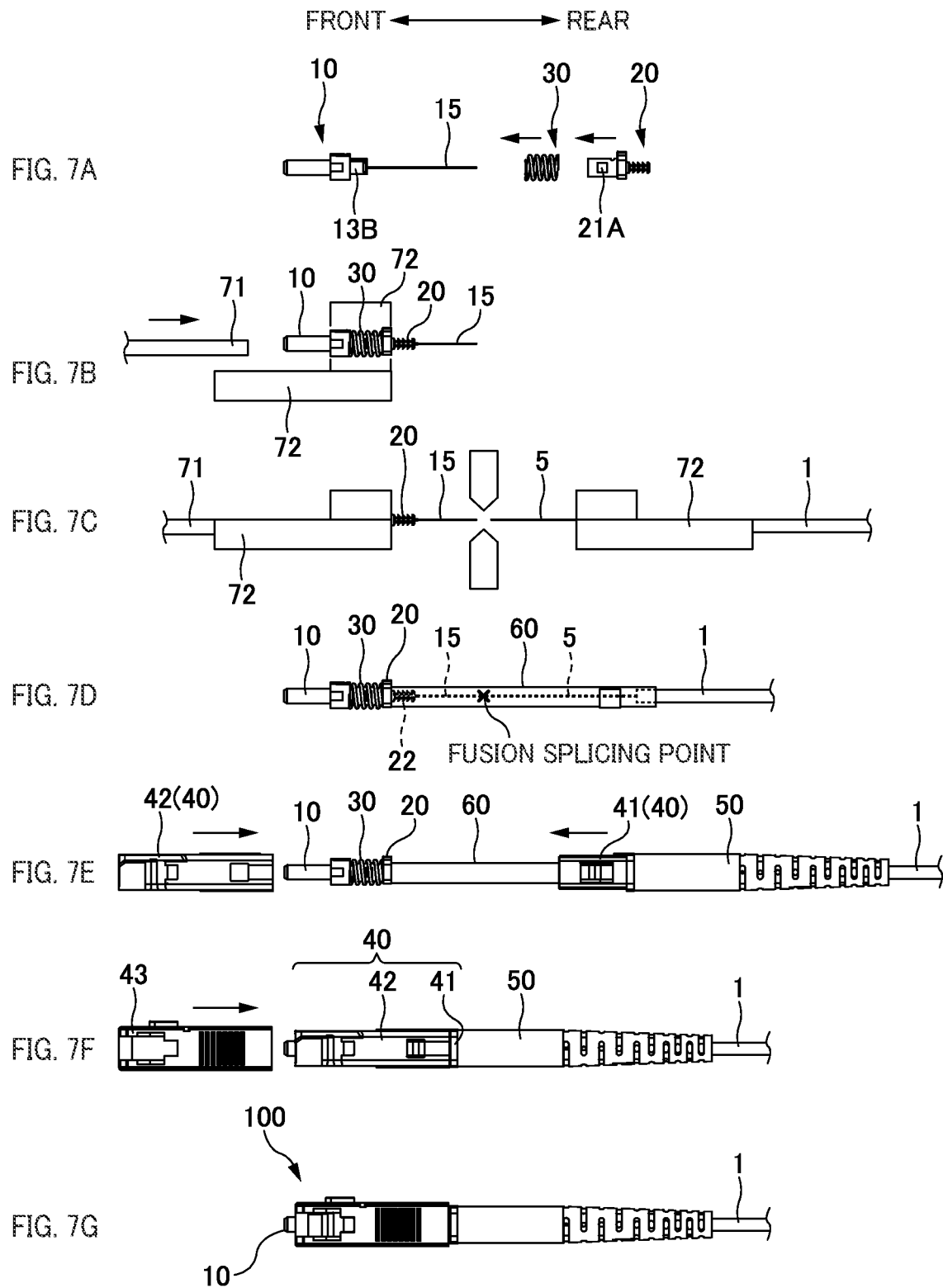

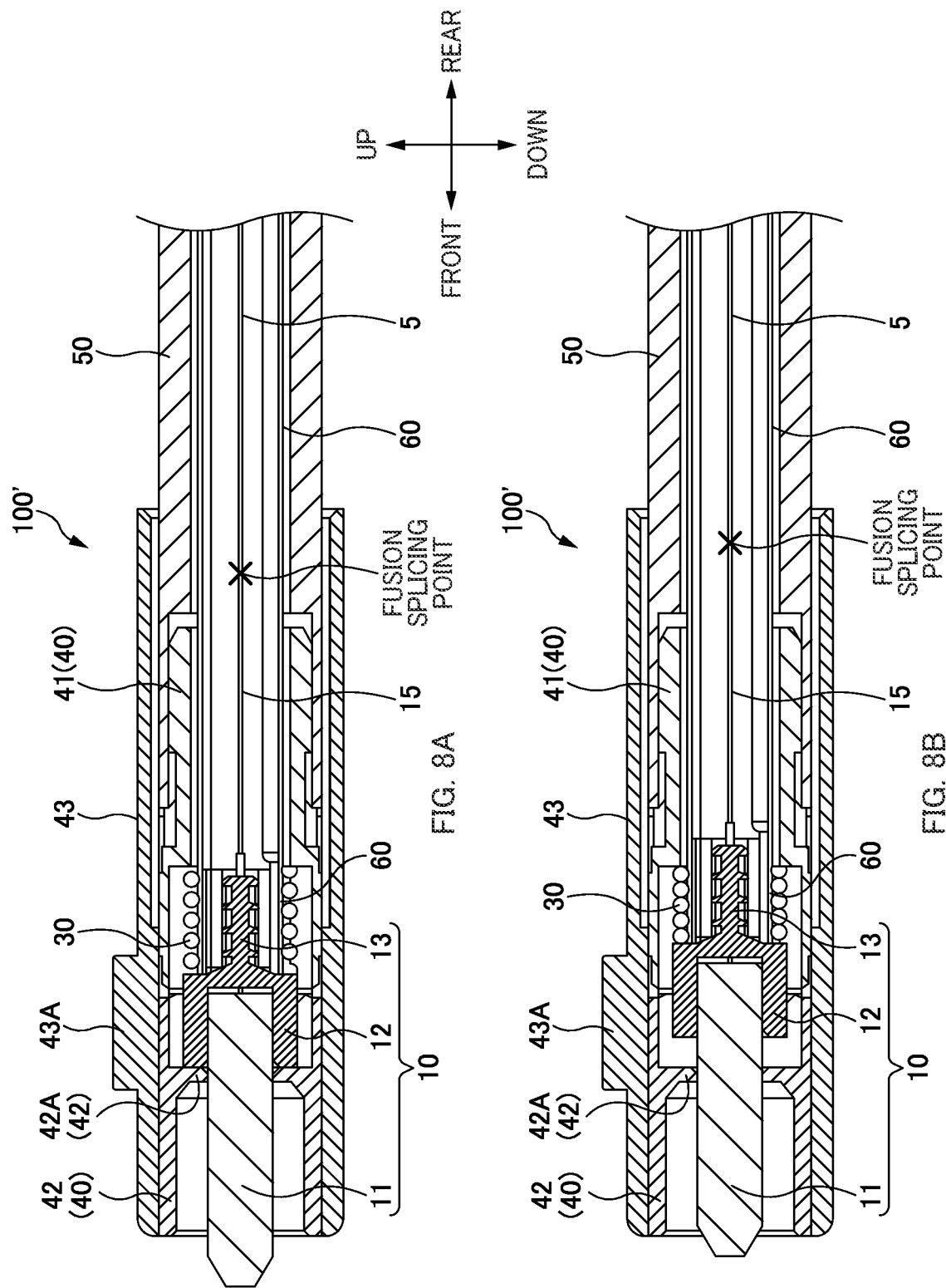

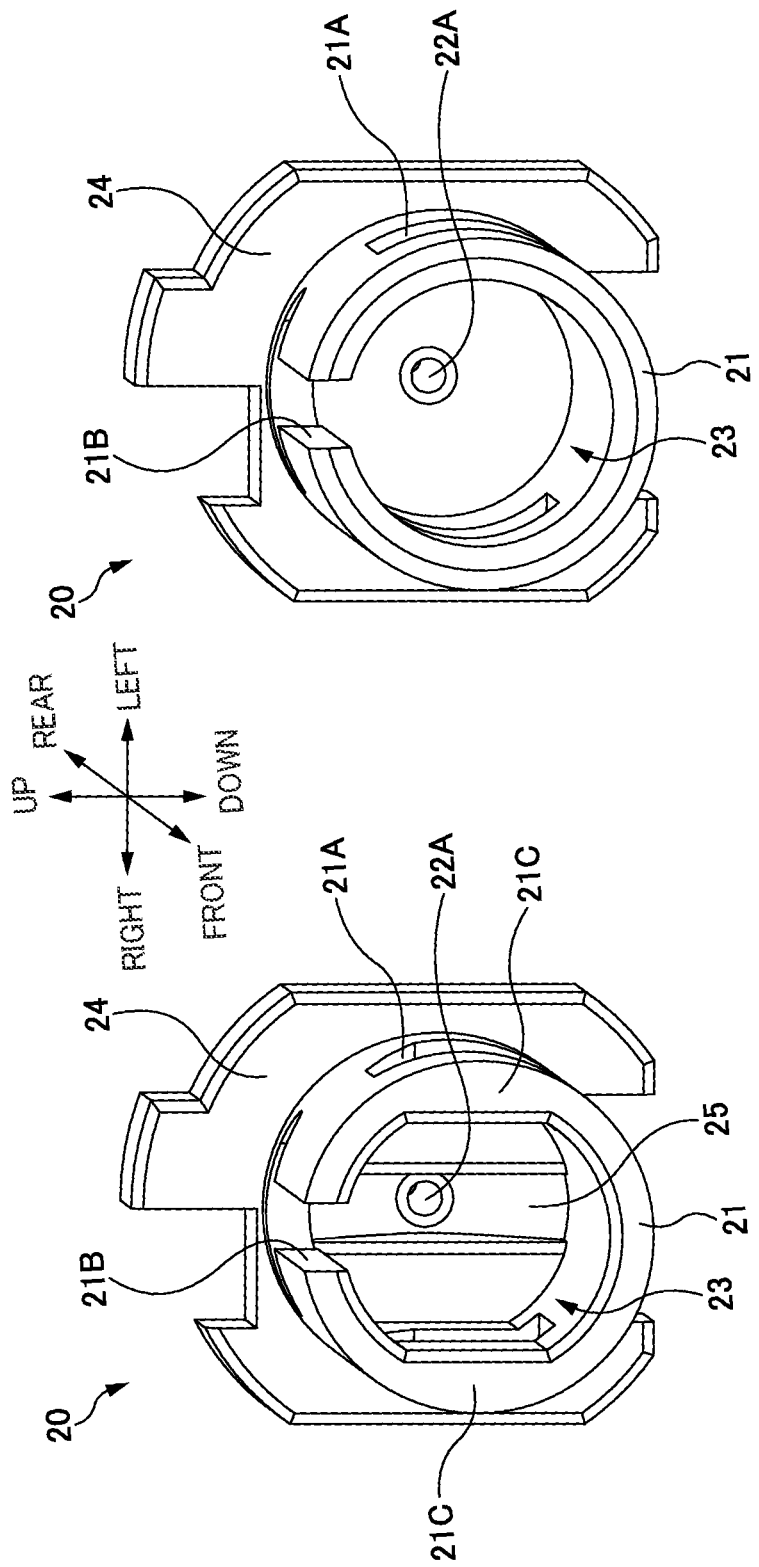

OPTICAL CONNECTOR AND METHOD OF MANUFACTURING OPTICAL CONNECTOR

BACKGROUND

Technical Field

The present disclosure relates to an optical connector and a method of manufacturing an optical connector.

Description of the Related Art

As conventional optical connectors, for example, an optical connector with an optical cord disclosed in PTL 1 and a fusion splice-on optical connector disclosed in PTL 2 are known.

PATENT LITERATURE

PTL 1: Japanese Patent Application Publication No. 2008-191410
PTL 2: International Publication No. WO2008/059843

In the optical connector disclosed in PTL 1, the optical fiber can be bent near the ferrule when the ferrule moves rearward. However, in the case of the optical connector disclosed in PTL 1, since the ferrule is directly fixed to the optical fiber extracted from an optical cord, it is difficult to assemble the optical connector at installation sites.

In the case of the optical connector disclosed in PTL 2, since a short optical fiber is fixed to the ferrule in advance, the optical connector can be assembled by fusion splicing the optical fiber extracted from an optical cord (including optical cables) and the short optical fiber at a work site. However, in the fusion splice-on optical connector at a work site as above, if the fusion splice point is covered with a heat shrink sleeve, the heat shrink sleeve and the ferrule compose a unitary structure, and hence, the optical fiber cannot be bent near the ferrule when the ferrule moves rearward.

SUMMARY

One or more embodiments may provide a fusion splice-on optical connector in which the optical fiber can be bent near the ferrule when the ferrule moves rearward.

An optical connector according to one or more embodiments comprising: a ferrule configured to hold an end part of a short fiber (or a fiber); and a holding member configured to hold the ferrule, wherein the holding member includes a holding part configured to hold the ferrule such that the ferrule is slidable, a fixing part configured to enable the short fiber extending from the ferrule to be inserted therethrough and configured to enable a sleeve for protecting a fusion splice point between the short fiber and another optical fiber to be fixed thereto, and a housing part configured to house a part of the short fiber between the holding part and the fixing part and house the short fiber in a state of being bent when the ferrule moves rearward.

A method of manufacturing an optical connector according to one or more embodiments comprising: preparing a ferrule configured to hold an end part of a short fiber; preparing a holding member including a holding part configured to hold the ferrule such that the ferrule is slidable, a fixing part configured to enable the short fiber extending from the ferrule to be inserted therethrough and configured to enable a sleeve for protecting a fusion splice point between the short fiber and another optical fiber to be fixed thereto, and a housing part configured to house a part of the short fiber between the holding part and the fixing part and house the short fiber in a state of being bent when the ferrule moves rearward; while inserting the short fiber into and through the fixing part of the holding member, making the holding part of the holding member hold the ferrule such that the ferrule is slidable; fusion splicing the short fiber extending from the fixing part and an optical fiber extracted from an optical cord; while protecting the fusion splice point with the sleeve, fixing an end part of the sleeve to the fixing part; and making the ferrule, the holding member, and the sleeve be housed in a housing.

Other features of one or more embodiments will be made clear from the description in the specification and drawings described later.

With the present disclosure, it is possible to achieve a fusion splice-on optical connector in which the optical fiber can be bent near the ferrule when the ferrule moves rearward.

BRIEF DESCRIPTION OF THE DRAWINGS

FIG. 7A is an explanatory diagram of a method of assembling the optical connector of one or more embodiments.

FIG. 7B is an explanatory diagram of a method of assembling the optical connector of one or more embodiments.

FIG. 7C is an explanatory diagram of a method of assembling the optical connector of one or more embodiments.

FIG. 7D is an explanatory diagram of a method of assembling the optical connector of one or more embodiments.

FIG. 7E is an explanatory diagram of a method of assembling the optical connector of one or more embodiments.

FIG. 7F is an explanatory diagram of a method of assembling the optical connector of one or more embodiments.

FIG. 7G is an explanatory diagram of a method of assembling the optical connector of one or more embodiments.

FIG. 8A is an explanatory cross-sectional view of an optical connector of a reference example.

FIG. 8B is an explanatory diagram illustrating the connector of the reference example at the time when an optical cord is pulled.

FIG. 9A is an explanatory diagram of a holding member of a modification example.

FIG. 9B is an explanatory diagram of the holding member illustrated in FIGS. 5A and 5B, which is a comparative explanatory diagram.

DESCRIPTION OF THE EMBODIMENTS

Embodiments, which are examples of the disclosure of the present application, will be described based on the description in the specification and drawings described later.

EMBODIMENTS

Basic Configuration of Optical Connector

Figure 1A:
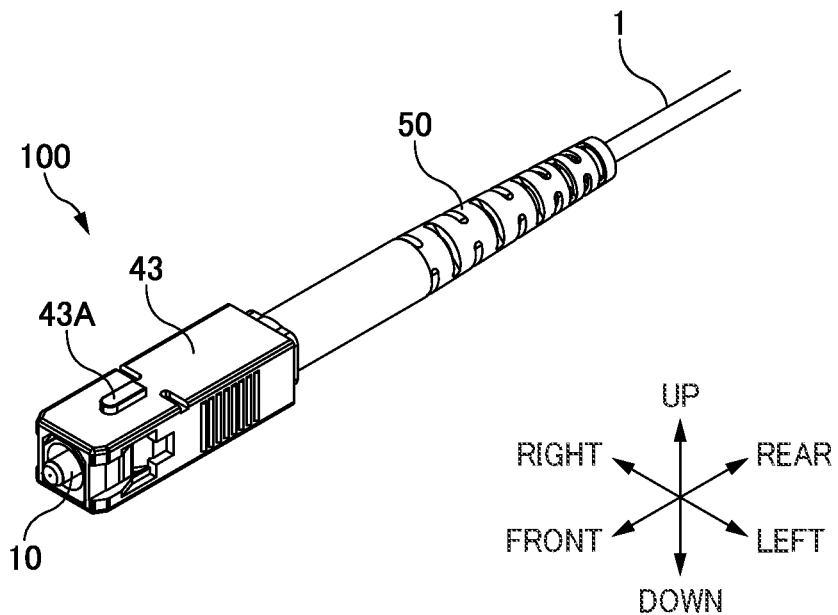
FIG. 1A is a perspective view of an optical connector according to one or more embodiments.
Figure 1B:
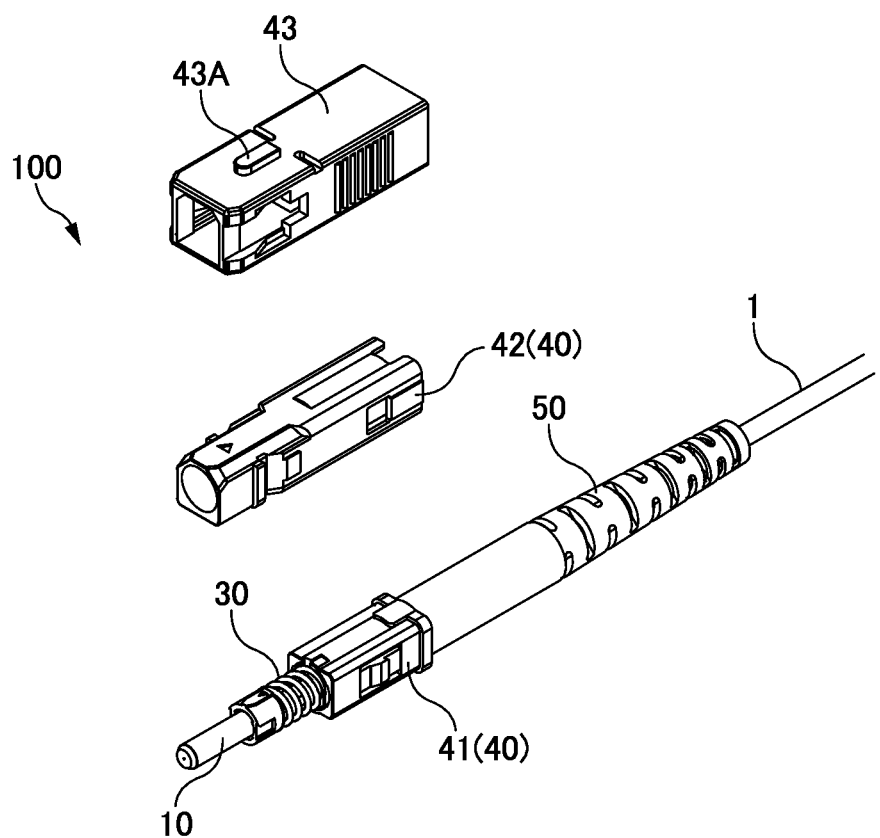
FIG. 1B is a perspective view of the optical connector according to one or more embodiments with a coupling and a front housing taken off.
Figure 2:
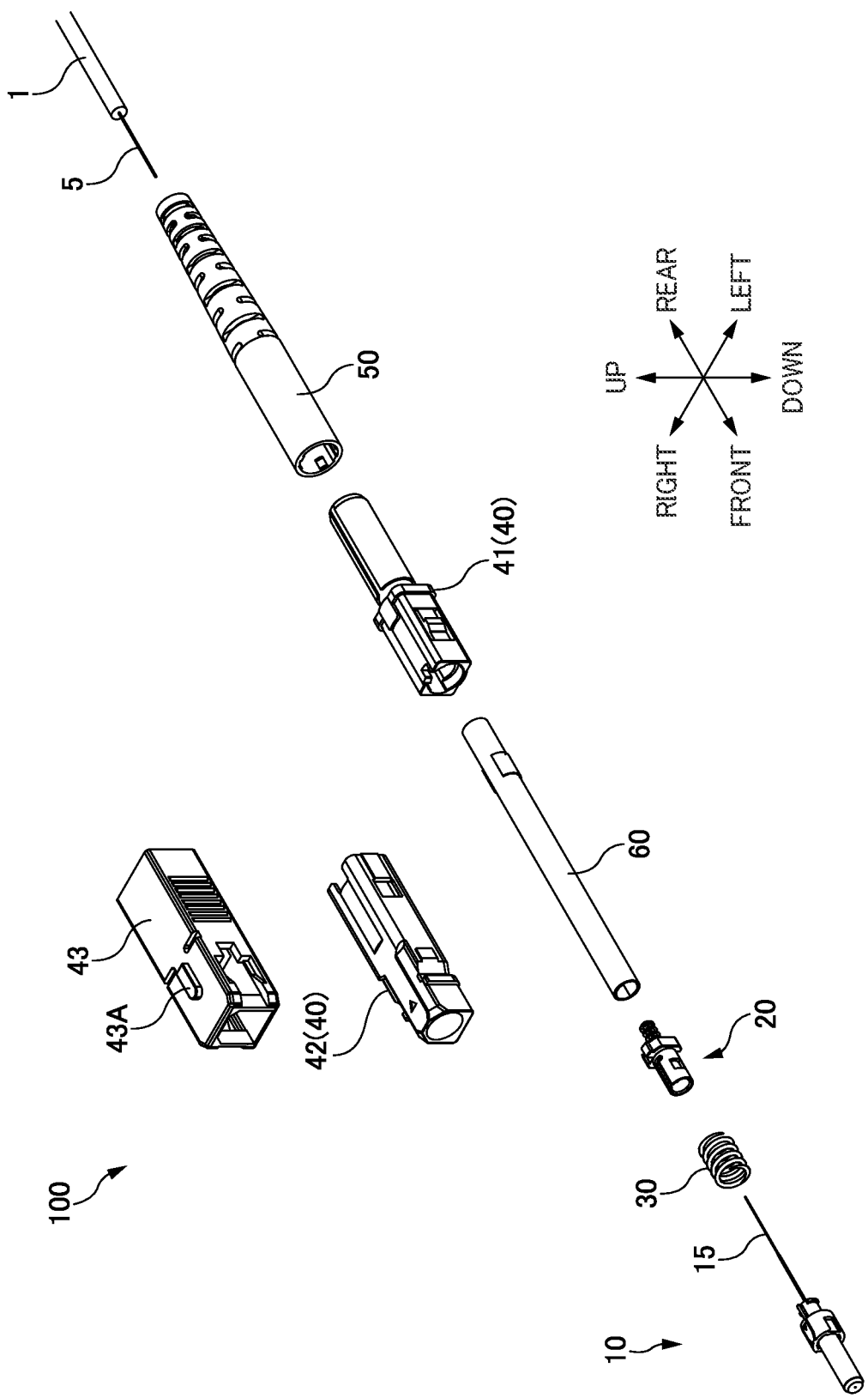
FIG. 2 is an exploded view of the optical connector according to one or more embodiments.
Figure 3:
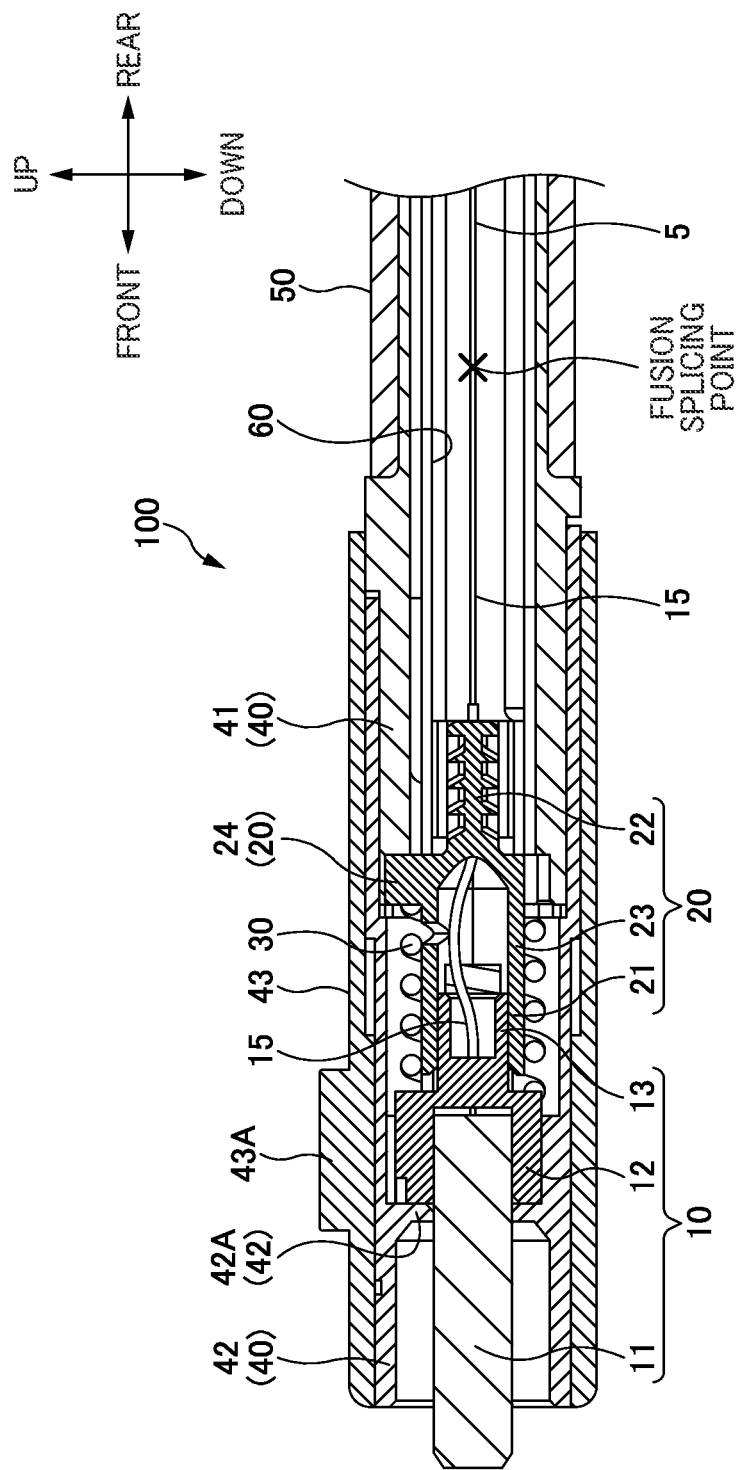
FIG. 3 is a cross-sectional view of the optical connector according to one or more embodiments.

FIG. 1A is a perspective view of an optical connector 100. FIG. 1B is a perspective view of the optical connector 100 with a coupling 43 and a front housing 42 taken off. FIG. 2 is an exploded view of the optical connector 100. FIG. 3 is a cross-sectional view of the optical connector 100. Here, the optical connector 100 will be described as an example of an optical connector of one or more embodiments.

In the following description, the directions are defined as illustrated in FIG. 1A. Specifically, the direction in which the optical connector 100 is attached or detached is defined as the "front-rear direction". The side on which the mating connector (not illustrated) is located is defined as the "front" side, and the opposite side to the front side as the "rear" side. Note that the front-rear direction may also be referred to as the "attaching/detaching direction". The width direction of the optical connector 100 is defined as the "left-right direction". The right side when viewed from the rear to the front is defined as "right", and the opposite side to the right as "left". The direction perpendicular to the front-rear direction and the left-right direction is defined as the "up-down direction". The side on which a key 43A is located is defined as the "up" side, and the opposite side to the up side as the "down" side.

The optical connector 100 is configured to be attached to an end of an optical cord 1. The optical cord 1 contains an optical fiber 5 (see FIG. 2 and other figures) inside the jacket. The optical cord 1 may also be referred to as an optical cable. The optical connector 100 is for on-site installation, specifically, the optical connector 100 can be attached to an end of the optical cord 1 by an operator at an installation site. The optical connector 100 is a fusion splice-on connector and houses inside a heat shrink sleeve 60 (described later) for protecting the fusion splice point. Here, an SC connector is illustrated as an example of an optical connector. However, the optical connector here is not limited to an SC connector and may be of other types (for example, an LC connector or the like). In addition, the optical connector may be a duplex one.

The optical connector 100 includes a ferrule 10, a holding member 20, a spring 30, a housing 40, and a boot 50.

Figure 4:
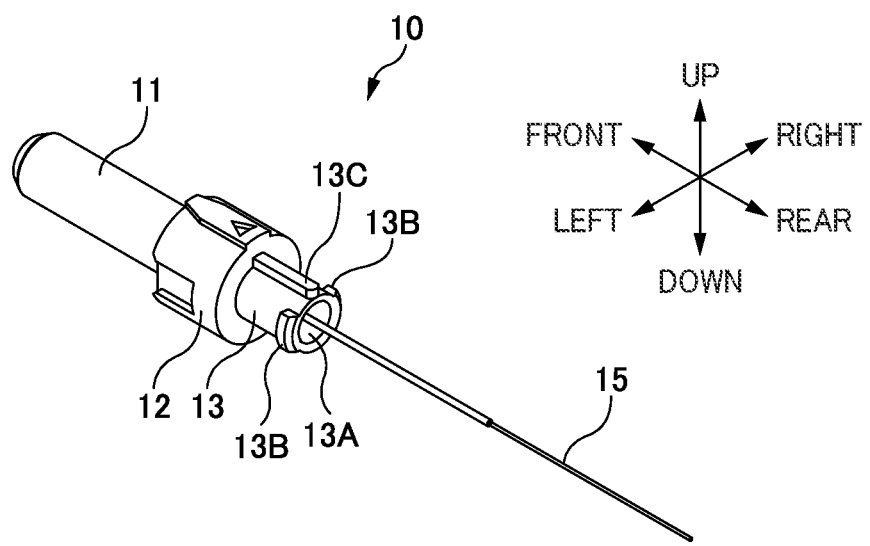
FIG. 4 is a perspective view of a ferrule of one or more embodiments.

FIG. 4 is a perspective view of the ferrule 10 of one or more embodiments.

The ferrule 10 is a member configured to hold an end part of an optical fiber. The ferrule 10 of one or more embodiments is configured to hold an end part of a short fiber 15 (a single optical fiber with a short length). The ferrule 10 of one or more embodiments has a body part 11 and a flange part 12. The body part 11 is a part configured to hold an end part of the short fiber 15. The body part 11 is a cylindrical ferrule made of, for example, zirconia. However, the body part 11 is not limited to one made of zirconia, and the body part 11 may be made of a resin. The flange part 12 protrudes from the outer periphery of the body part 11. The flange part 12 is configured to be in contact with a distal end of the spring 30. The ferrule 10 is configured to be pressed forward by the flange part 12 receiving a force from the spring 30. The flange part 12 is located to a rear side of the body part 11, and the flange part 12 has a unitary structure with the body part 11 and is thus fixed to the body part 11. The flange part 12 is made of, for example, a resin or a metal (for example, stainless steel). Note that the configuration is not limited to ones in which the body part 11 and the flange part 12 are made of different materials. For example, the ferrule 10 may have a configuration in which the body part 11 and the flange part 12 are integrally molded from a resin.

The flange part 12 of the ferrule 10 of the one or more embodiments has a protrusion part 13. The protrusion part 13 is a part protruding rearward from the flange part 12, in other words, in the longitudinal direction of the optical fiber, which is a part slidably held by the holding member 20. Note that the word "slidable" denotes a state in which the protrusion part 13 is movable relative to the holding member 20 in the front-rear direction. The protrusion part 13 is a cylindrical part and has an insertion hole 13A configured to enable the short fiber 15 to be inserted therethrough. The rear end of the short fiber 15 passing through the insertion hole 13A extends rearward from the protrusion part 13. Note that the rear end of the short fiber 15 is fusion spliced to the optical fiber 5 extracted from the optical cord 1.

The protrusion part 13 has engagement parts 13B and a guiding part 13C.

The engagement parts 13B are configured to slidably engage the holding member 20. In this case, a pair of engagement parts 13B are located on right and left sides of the outer periphery (in a direction intersecting the circumference of the cylindrical part) of the protrusion part 13. However, the number and arrangement of the engagement parts 13B are not limited to this configuration. The engagement between the engagement parts 13B and the holding member 20 prevents the ferrule 10 from coming forward off the holding member 20. In this configuration, the engagement parts 13B are projecting parts projecting outward from the outer surface of the cylindrical protrusion part 13 (projections, engagement projections). However, the engagement parts 13B may have different shapes as long as they can slidably engage engagement parts 21A of the holding member 20 (for example, window shapes).

The guiding part 13C is configured to movably (slidably) guide in the front-rear direction while restricting the movement in the rotation direction around the axis in the front-rear direction. In this case, the guiding part 13C has a protruding shape extending in the front-rear direction. However, the shape of the guiding part 13C is not limited to a protruding shape and may be another shape (for example, a groove shape). In addition, the configuration without the guiding part 13C may be possible.

Figure 5A:
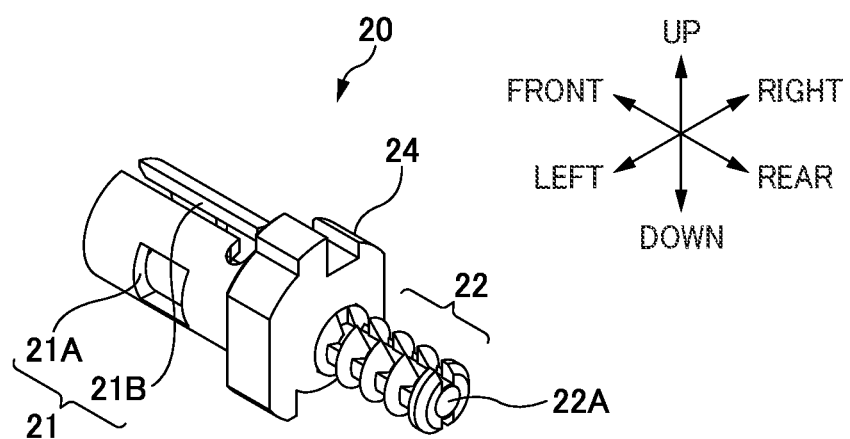
FIG. 5A is a perspective view of a holding member according to one or more embodiments.
Figure 5B:
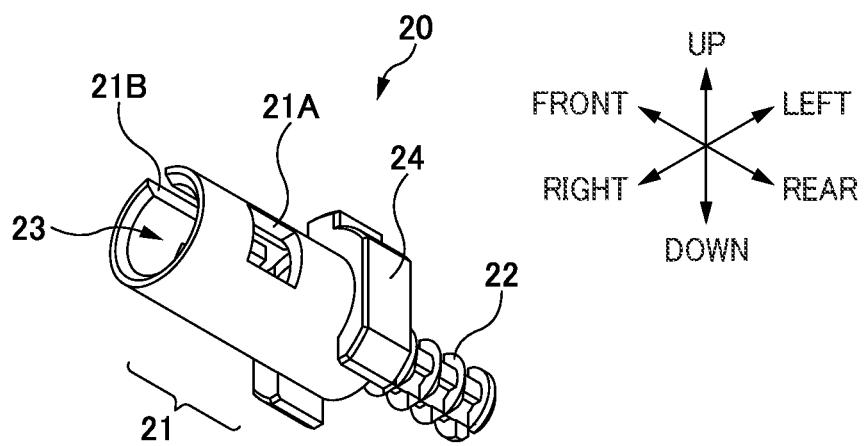
FIG. 5B is a perspective view of a holding member according to one or more embodiments.
Figure 6A:
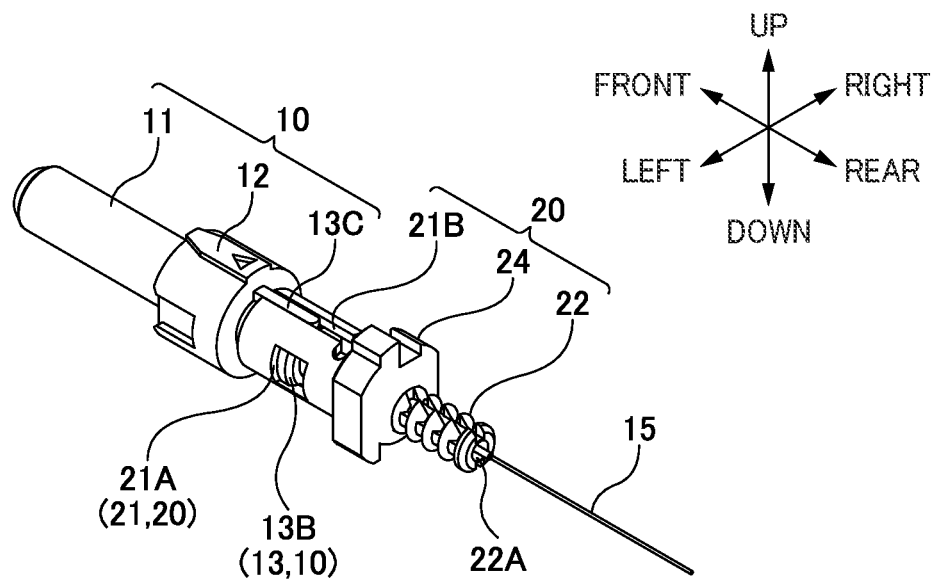
FIG. 6A is an explanatory diagram illustrating the holding member holding the ferrule.
Figure 6B:
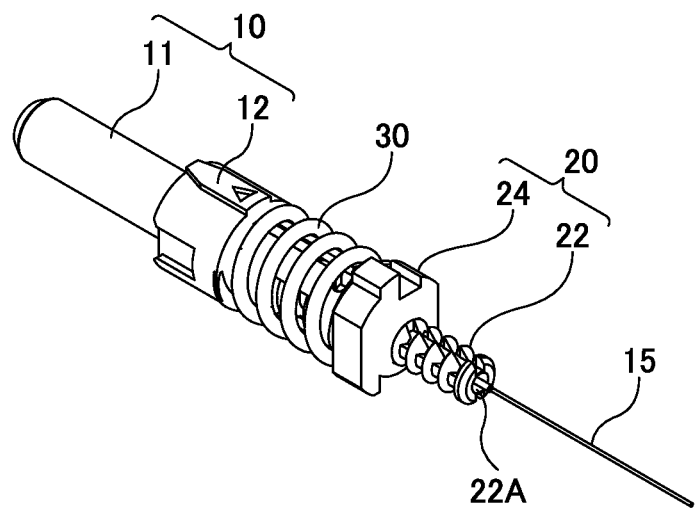
FIG. 6B is an explanatory diagram illustrating the holding member holding the ferrule.

FIGS. 5A and 5B are perspective views of the holding member 20. FIGS. 6A and 6B are explanatory diagrams illustrating the holding member 20 holding the ferrule 10. FIG. 6A is an explanatory diagram illustrating the holding member 20 holding the ferrule 10 without the spring 30. FIG. 6B is an explanatory diagram illustrating the holding member 20 holding the ferrule 10 with the spring 30 interposed in between.

The holding member 20 is configured to hold the ferrule 10 such that the ferrule 10 is slidable. The holding member 20 has a holding part 21, a fixing part 22, a housing part 23, and a flange part 24.

The holding part 21 is configured to hold the ferrule 10 (specifically, the protrusion part 13) such that the ferrule 10 is slidable. The holding part 21 is a cylindrical part and is provided at a front part of the holding member 20 (on the ferrule side). The cylindrical protrusion part 13 of the ferrule 10 is located inside the cylindrical holding part 21 so as to be slidable. The cylindrical holding part 21 is located inside the spring 30.

The holding part 21 has the engagement parts 21A and a guiding part 21B.

The engagement parts 21A are parts that the engagement parts 13B of the ferrule 10 engage such that the ferrule 10 is slidable. In this case, the engagement parts 21A are window-like parts extending in the front-rear direction (window parts, elongate holes). However, the engagement parts 21A may have other shapes (for example, projecting shapes) as long as the engagement parts 13B of the ferrule 10 can slidably engage them. Since the holding part 21 has the engagement parts 21A (the engagement parts 21A that the engagement parts 13B of the ferrule slidably engage), the holding member 20 can hold the ferrule so that the ferrule 10 does not come off forward.

The guiding part 21B is configured to movably (slidably) guide in the front-rear direction while restricting the movement in the rotation direction around the axis in the front-rear direction. Here, the guiding part 21B has a slit shape extending in the front-rear direction and is capable of guiding the guiding part 13C of the ferrule 10 in the front-rear direction. However, the guiding part 21B is not limited to one having a slit shape and may have another shape (for example, a projecting shape). A configuration without the guiding part 21B may be possible.

The fixing part 22 is a part (a sleeve fixing part) to which the heat shrink sleeve 60 is fixed. The fixing part 22 is a cylindrical part having an insertion hole 22A configured to enable the short fiber 15 to be inserted therethrough. The fixing part 22 is provided in a rear side of the holding member 20. As illustrated in FIGS. 6A and 6B, in the state in which the holding member 20 holds the ferrule 10, the rear end of the short fiber 15 inserted into and passing through the insertion hole 22A extends rearward from the fixing part 22. The fixing part 22 is a part of the holding member 20 protruding rearward (on the heat shrink sleeve 60 side). When the heat shrink sleeve 60 is heated with the fixing part 22 covered with the front end of the heat shrink sleeve 60, the front end of the heat shrink sleeve 60 having shrank is fixed to the fixing part 22. The outer surface of the cylindrical fixing part 22 has protrusions and recesses (wavy outer diameter) to makes it easy to fix the heat shrink sleeve 60. However, a configuration without the protrusions and recesses on the outer surface of the fixing part 22 is possible. Note that since the front end of the heat shrink sleeve 60 having shrank is fixed to the fixing part 22, the holding member 20 and the heat shrink sleeve 60 have a unitary structure.

The housing part 23 is configured to house the short fiber between the holding part 21 and the fixing part 22. The housing part 23 is cylindrical and is located between the holding part 21 and the fixing part 22. The cylindrical housing part 23 is located inside the spring 30. The housing part 23 has a cavity formed in its inside, and the short fiber 15 can bend inside the housing part 23. Although when the connector is connected, the ferrule 10 moves rearward, and the short fiber 15 is in a state of being bent, the housing part 23 is capable of housing the short fiber 15 in the state of being bent when the ferrule 10 moved rearward in the cavity.

In one or more embodiments, as illustrated in FIG. 3, also before the ferrule 10 moves rearward (before the ferrule 10 is pressed against the mating ferrule), the short fiber 15 is housed being bent inside the housing part 23. Since the short fiber 15 is bent in advance, the load acting on the short fiber 15 when the ferrule 10 moves rearward and the short fiber 15 bends can be smaller than in the case in which the short fiber 15 bends from the straight state. This reduces the signal loss when the connector is connected. However, a configuration in which the short fiber 15 is not bent before the ferrule 10 moves rearward is possible.

The flange part 24 protrudes from the outer periphery of the holding member 20 and is configured to be in contact with the rear end of the spring 30. As illustrated in FIG. 6B, the spring 30 is located between the flange part 24 of the holding member 20 and the flange part 12 of the ferrule 10. However, a configuration in which the holding member 20 does not have the flange part 24, and the rear end of the spring 30 is in contact with the front end surface of a rear housing 41 is possible.

The rear end surface of the flange part 24 is in contact with the rear housing 41 (described later). In other words, the holding member 20 is supported by the rear housing 41 at the flange part 24. With this configuration, if the optical cord 1 is pulled rearward when the connector is connected, it is possible to prevent the holding member 20 from moving rearward because the holding member 20 is supported from the rear side by the rear housing 41. As described above, the flange part 24 has a function as a stopper working when the optical cord 1 is pulled. Note that the rear end surface of the flange part 24 also has a function of positioning the heat shrink sleeve 60 (described later).

The spring 30 is a member configured to press the ferrule such that the ferrule 10 can move rearward. Since the spring presses the ferrule 10 forward, the ferrule 10 is pressed against the mating ferrule (not illustrated) at a specified force when the connectors are connected. Since the spring 30 is compressed and deformed when the connector is connected, the ferrule 10 can move rearward. In one or more embodiments, since the engagement parts 21A of the holding member 20 engage the engagement parts 13B of and the ferrule 10, and the ferrule 10 is held by the holding member 20 so as not to come off forward, the spring 30 compressed and deformed can be located between the flange part 24 of the holding member 20 and the flange part 12 of the ferrule 10. In one or more embodiments, the strength of the spring 30 is set so that the ferrule 10 and the mating ferrule can press against each other at a specified force.

In one or more embodiments, the spring 30 is located outside the housing part 23 of the holding member 20. This configuration prevents the short fiber 15 housed in the housing part 23 from coming into contact with the spring 30. Note that if the short fiber 15 comes into contact with the spring 30 when the short fiber 15 bends, there is a possibility that the short fiber 15 may be damaged. In contrast, in one or more embodiments, since the spring 30 is located outside the housing part 23, it is possible to prevent the bent short fiber 15 from coming into contact with the spring 30 and it is in turn possible to prevent damage in the short fiber 15.

The heat shrink sleeve 60 is a member configured to protect the fusion splice point. The heat shrink sleeve 60 may also be referred to as a protective sleeve (or a heat shrink tube, a protective tube, or the like). The heat shrink sleeve 60 protects the fusion splice point between the short fiber 15 of the ferrule 10 and the optical fiber 5 extracted from the optical cord 1. The front end of the heat shrink sleeve 60 covers and is fixed to the fixing part 22 of the holding member 20. The rear end of the heat shrink sleeve 60 covers and is fixed to the front edge of the jacket of the optical cord 1 (the edge of the jacket of the optical cord 1 adjacent to the stripped part) (this is described later. See FIG. 7D). When the heat shrink sleeve 60 is heated, the front end of the heat shrink sleeve 60 having shrank is fixed to the fixing part 22, and the rear end is fixed to the optical cord 1 (this is described later). With this operation, the holding member 20 and the optical cord 1 (specifically, the front edge of the jacket) have a unitary structure via the heat shrink sleeve 60.

The housing 40 is a member configured to house members such as the ferrule 10, the holding member 20, and the heat shrink sleeve 60. The housing 40 includes the rear housing 41 and the front housing 42. Note that the rear housing 41 and the front housing 42 illustrated in figures are an example of the housing 40, and the housing 40 is not limited to this shape.

The rear housing 41 is a rear member of the housing 40. The rear housing 41 is a square tubular member and is also referred to as a stop ring. The front housing 42 is a front member of the housing 40. The front end surface of the rear housing 41 is in contact with the flange part 24 of the holding member 20. The front end surface of the rear housing 41 functions as a support surface to support the holding member 20 from the rear. Since the rear housing 41 supports the holding member 20 from the rear, even if the optical cord 1 is pulled rearward when the connector is connected, it is possible to prevent the holding member 20 from moving rearward (this is described later). Since the holding member 20 is prevented from moving rearward, it is possible to prevent the ferrule 10 from being pulled rearward, and this prevents increase in the signal loss (this is described later).

The front housing 42 is a square tubular member and is also referred to as a plug frame. As illustrated in FIG. 3, the front housing 42 has a protruding part 42A inside. The protruding part 42A is configured to be in contact with the flange part 12 of the ferrule 10 to prevent the ferrule 10 pressed by the spring from coming off forward. With this configuration, the front housing 42 houses the ferrule 10 such that the ferrule 10 can move rearward.

The front housing 42 has the coupling 43. The coupling 43 is a member that is operated (a member that is pulled) when the optical connector 100 is disconnected, and the coupling 43 is slidable relative to the front housing 42. The coupling 43 has the key 43A to restrict the orientation of the optical connector 100. However, a configuration in which the front housing 42 does not have the coupling 43 is possible.

As illustrated in FIG. 3, in one or more embodiments, when the housing 40 houses the ferrule 10 and the holding member 20, the bent short fiber 15 is housed in the housing part 23. Since the bent short fiber 15 is housed as above, the load that acts on the short fiber 15 when the ferrule 10 moves rearward and the short fiber 15 bends can be smaller than in the case in which the short fiber 15 bends from the straight state. This reduces the signal loss at the time when the connector is connected.

The boot 50 is a member to protect the optical cord 1. The boot 50 is located in a rear part of the optical connector 100.

Comparison with Reference Example

FIG. 8A is an explanatory cross-sectional view of an optical connector 100' of a reference example.

The optical connector 100' of the reference example includes a ferrule 10, a spring 30, a housing 40 (a rear housing 41 and a front housing 42), and a boot 50 but does not include a holding member 20. The ferrule 10 of the reference example has a protrusion part 13 on the rear side of the flange part 12. In the reference example, the protrusion part 13 of the ferrule 10 functions as a fixing part (sleeve fixing part) to which the heat shrink sleeve 60 is fixed. In the reference example, the front end of the heat shrink sleeve 60 is fixed to the protrusion part 13 of the ferrule 10, and the rear end of the heat shrink sleeve 60 is fixed to the front edge of the jacket of the optical cord 1 (this is not illustrated and is the same as or similar to the one in FIG. 7D described later). In the reference example, with this configuration, the ferrule 10 and the optical cord 1 (specifically, the front edge of the jacket) have a unitary structure via the heat shrink sleeve 60. Since the optical connector 100' of the reference example does not have the holding member 20, the spring 30 is located between the flange part 12 of the ferrule 10 and the rear housing 41. In the reference example, the optical fiber cannot be bent near the ferrule 10 when the ferrule 10 moves rearward. In the reference example, when the connector is connected, and the ferrule 10 is pressed against the mating ferrule (not illustrated), the ferrule 10 and the heat shrink sleeve 60 move rearward together.

FIG. 8B is an explanatory diagram illustrating the connector of the reference example for the case in which the optical cord 1 is pulled. In the reference example, when the optical cord 1 is pulled rearward, the ferrule 10 is pulled rearward via the heat shrink sleeve 60. When the optical cord 1 is pulled strongly, the ferrule 10 moves rearward against the force of the spring 30 as illustrated in FIG. 8B. Thus, if the optical cord 1 is pulled strongly when the connector is connected, the ferrule 10 may move rearward and away from the ferrule of the mating connector, and there is a possibility that the signal loss may increase.

In the case of the optical connector 100' of the reference example, if the force of the spring 30 is set to be strong, the spring 30 can stand against the pulling force of the optical cord 1, and it is possible to prevent the ferrule 10 from moving rearward when the optical cord 1 is pulled. However, if the force of the spring 30 is set to be strong, the contact force between the ferrule 10 and the mating ferrule at the time when the connector is connected is too strong, and this makes it impossible to make the ferrules be pressed against each other at a specified force.

For example, Transmission with Applied Load (Telcordia GR-326-CORE Issue 4 4.4.3.5, hereinafter referred to as "TWAL") specifies a test in which the signal loss is measured while the pulling load is being applied to the optical cord extending from the optical connector. For example, IEC 61753-1 specifies that the ferrules should be pressed against each other at a specified force. Because in the configuration of the reference example, the optical fiber cannot be bent near the ferrule 10 when the ferrule 10 moves rearward, it is difficult to meet both the regulation of TWAL and the regulation of IEC 61753-1 at the same time.

In contrast, the optical connector 100 of one or more embodiments, unlike the optical connector 100' of the reference example, includes the holding member 20 configured to hold the ferrule 10, and the holding member 20 includes the fixing part 22 to which the heat shrink sleeve 60 is fixed. With the configuration, in one or more embodiments, since the holding member 20 and the optical cord 1 (specifically, the front edge of the jacket) have a unitary structure via the heat shrink sleeve 60, when the optical cord 1 is pulled rearward, the holding member 20 is pulled rearward via the heat shrink sleeve 60. In addition, since the holding member 20 of one or more embodiments includes the holding part 21 configured to hold the ferrule 10 such that the ferrule 10 is slidable, when the optical cord 1 is pulled rearward, it is possible to prevent the force from being transmitted to the ferrule 10. With this configuration, in one or more embodiments, when the optical cord 1 is pulled, it is possible to prevent the ferrule 10 from being pulled rearward. In addition, since the holding member 20 of one or more embodiments is supported by the rear housing 41 from the rear, when the optical cord 1 is pulled rearward, it is possible to prevent the holding member 20 from moving rearward. With this configuration, in one or more embodiments, when the optical cord 1 is pulled, it is possible to prevent the ferrule 10 from being pulled rearward. Thus, in one or more embodiments, when the optical cord 1 is pulled rearward, it is possible to prevent increase in the signal loss.

In one or more embodiments, since the holding member 20 includes the holding part 21 configured to hold the ferrule 10 such that the ferrule 10 is slidable and the housing part 23 capable of housing the short fiber 15 in the state of being bent when the ferrule 10 moves rearward, even in the case in which the holding member 20 cannot move rearward, it is possible to bend the optical fiber (the short fiber 15) near the ferrule 10 when the ferrule 10 moves rearward. In addition to the configuration described above, since this configuration does not require the force of the spring 30 to be set to be strong to stand against the pulling force of the optical cord 1, it is possible in one or more embodiments to set the strength of the spring 30 such that the ferrule 10 and the mating ferrule are pressed against each other at a specified force.

Thus, in one or more embodiments, since the optical connector 100 includes the holding member 20 having the holding part 21, the fixing part 22, and the housing part 23, it is possible to achieve both preventing increase in the signal loss at the time when the optical cord 1 is pulled and making the ferrule 10 and the mating ferrule be pressed against each other at a specified force. Thus, one or more embodiments make it possible to achieve, for example, both the regulation of TWAL and the regulation of IEC 61753-1 at the same time.

Method of Assembling Optical Connector 100

FIGS. 7A to 7G are diagrams for explaining a method of assembling the optical connector 100 of the one or more embodiments. FIGS. 7A to 7G are diagrams also for explaining a method of manufacturing the optical connector 100.

First, the operator prepares the foregoing ferrule 10 (see FIG. 4) and the holding member 20 (see FIGS. 5A and 5B).

Next, as illustrated in FIG. 7A, the operator makes the holding member 20 hold the ferrule 10. In this operation, the operator, while inserting the short fiber 15 into and through the fixing part 22 of the holding member 20, makes the ferrule be held in the holding part 21 of the holding member 20 such that the ferrule 10 is slidable (see FIGS. 6A and 6B). In addition, the operator, while placing the spring 30 between the flange part 12 of the ferrule 10 and the flange part 24 of the holding member 20, engages the engagement parts 13B of the ferrule 10 with the engagement parts 21A of the holding member so that the holding member 20 holds the ferrule 10. Note that when the engagement parts 13B of the ferrule 10 and the engagement parts 21A of the holding member 20 are engaged, the assembly composed of the ferrule 10, the holding member 20, and the spring has a configuration illustrated in FIG. 6B. In this state, although the spring 30 is compressed a little, the ferrule 10 is prevented from coming forward off the holding member 20 because the engagement parts 13B of the ferrule 10 and the engagement parts 21A of the holding member 20 are engaged. Not that the spring 30 is located outside the housing part 23 of the holding member 20. This configuration prevents the short fiber 15 from coming into contact with the spring 30. When the engagement parts 13B of the ferrule 10 and the engagement parts 21A of the holding member 20 are engaged, the short fiber 15 held by the ferrule 10 is inserted into and passes through the insertion hole 22A of the fixing part 22 of the holding member 20 and extends rearward from the fixing part 22.

Next, as illustrated in FIG. 7B, the operator places the assembly composed of the ferrule 10, the holding member 20, and the spring 30 to a holder 72. The holder 72 is a member to place the optical fiber to a fusion splicer. Note that in one or more embodiments, as illustrated in FIG. 7B, a cap member 71 is attached to the ferrule 10. The cap member 71 is for the operator to apply a pulling force to the fusion splice point after fusion splicing.

The operator extracts the optical fiber 5 from the optical cord 1 and places the optical fiber 1 (the optical fiber 5) to another holder 72. The operator, before placing the optical cord 1 to the holder 72, inserts the optical cord 1 into and through members such as the boot 50, the rear housing 41, and the heat shrink sleeve 60 in advance. The operator also performs pretreatment on the optical fiber 5 such as removing the coating of the optical fiber 5 and cutting the optical fiber 5 to a specified length.

Next, as illustrated in FIG. 7C, the operator places the holder 72 to a fusion splicer and fusion splices the short fiber and the optical fiber 5 extracted from the optical cord 1. After fusion splicing, the operator opens the holder 72, covers the heat shrink sleeve 60 on the fusion splice point, and heats the heat shrink sleeve 60 with a heater. Note that in this operation, the operator, while holding the cap member 71 and the optical cord 1 and applying a pulling force to the fusion splice point, performs the work of covering the heat shrink sleeve 60 on the fusion splice point, the work of placing the heat shrink sleeve 60 to the heater, and the like. Since the cap member 71 is attached to the ferrule 10, it is easy to apply the pulling force to the fusion splice point.

When the operator covers the heat shrink sleeve 60 on the fusion splice point, the operator moves the heat shrink sleeve 60 which the optical cord 1 is inserted into and passed through in advance. In this operation, the operator moves the heat shrink sleeve 60 forward (toward the ferrule 10) until the front end of the heat shrink sleeve 60 comes into contact with the rear end surface of the flange part 24 of the holding member 20. In the state in which the front end of the heat shrink sleeve 60 is in contact with the rear end surface of the flange part 24 of the holding member 20, the front end of the heat shrink sleeve 60 covers the fixing part 22 of the holding member 20, the heat shrink sleeve 60 covers the fusion splice point, and the rear end of the heat shrink sleeve 60 covers the front edge of the jacket of the optical cord 1 (the edge of the jacket of the optical cord 1 adjacent to the stripped part). As described above, in one or more embodiments, the flange part 24 of the holding member 20 has a function of positioning the heat shrink sleeve 60. Since the operator has only to moves the heat shrink sleeve 60 until the front end of the heat shrink sleeve 60 comes into contact with the rear end surface of the flange part 24 of the holding member 20, the work of moving the heat shrink sleeve 60 to a desired position is easy.

When the heat shrink sleeve 60 is heated by the heater, the fusion splice point is in the state of being protected by the heat shrink sleeve 60. In addition, when the heat shrink sleeve 60 is heated by the heater, the front end of the heat shrink sleeve 60 is in the state of being fixed to the fixing part 22 of the holding member 20, and the rear end of the heat shrink sleeve 60 is in the state of being fixed to the optical cord 1 (see FIG. 7D).

After the heat shrink sleeve 60 is heated, as illustrated in FIG. 7D, the operator removes the cap member 71 which was attached to the ferrule 10. After removing the cap member 71, as illustrated in FIG. 7E, the operator engages the front housing 42 with the rear housing 41 and houses members such as the ferrule 10, the holding member 20, and the heat shrink sleeve 60 into the housing 40. In this operation, the flange part 24 of the holding member 20 comes into contact with the rear housing 41, and the flange part 12 of the ferrule 10 comes into contact with the protruding part 42A of the front housing 42. Then, since the holding member 20 holds the ferrule 10 such that the ferrule is slidable, the ferrule 10 and the holding member 20 are housed in the housing 40 so as to come closer. Since the ferrule and the holding member 20 come closer, as illustrated in FIG. 3, the short fiber 15 is in the state of being bent inside the housing part 23 of the holding member 20. In other words, in one or more embodiments, when the ferrule 10 and the holding member 20 are housed in the housing 40, the bent short fiber 15 is housed in the housing part 23.

As illustrated in FIG. 7E, after the front housing 42 is attached, the operator attaches the coupling 43 to the front housing 42 as illustrated in FIG. 7F. With this process, as illustrated in FIG. 7G, assembling of the optical connector 100 of one or more embodiments is completed (manufacturing of the optical connector 100 is completed). In one or more embodiments, it is possible to assemble (manufacture) the optical connector 100 including the holding member 20 having the holding part 21, the fixing part 22, and the housing part 23. As already described, the optical connector 100 assembled according to one or more embodiments can achieve both preventing increase in the signal loss at the time when the optical cord 1 is pulled and pressing the ferrule 10 against the mating ferrule at a specified force.

Modification Example

Figure 10:
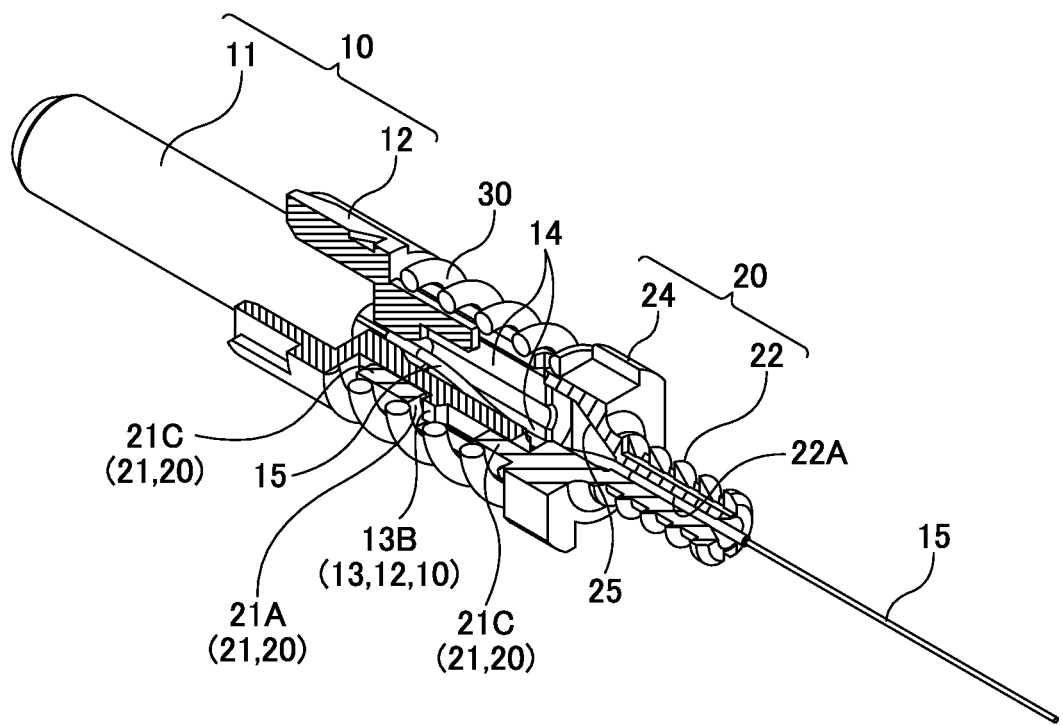
FIG. 10 is an explanatory diagram illustrating the holding member of the modification example holding a ferrule.

FIG. 9A is an explanatory diagram of a holding member 20 of a modification example. FIG. 9B is an explanatory diagram of the holding member 20 illustrated in FIGS. 5A and 5B, which is a comparative explanatory diagram. FIG. 10 is an explanatory diagram of the holding member 20 of the modification example holding the ferrule 10. Also in the modification example, the holding member 20 has a holding part 21, a fixing part 22, a housing part 23, and a flange part 24. In addition, also in the modification example, the holding part 21 has engagement parts 21A and a guiding part 21B.

As illustrated in FIG. 9A, the holding member 20 of the modification example includes a guiding part 25. The guiding part 25 is configured to guide the optical fiber (the short fiber 15) to bend in a specific direction. The guiding part 25 has a recessed shape extending in a specified direction (here, in the up-down direction) perpendicular to the front-rear direction and is located in the opening on the housing part 23 side of the insertion hole 22A. The guiding part 25 is capable of guiding the short fiber 15 to bend in the direction of the recess. Thus, in the following description, the direction in which the recess of the guiding part 25 extends (here, the up-down direction) is also referred to as the "guiding direction". In this case, since the recess of the guiding part 25 extends in the up-down direction, the guiding direction is the up-down direction, and the guiding part 25 guides the short fiber 15 to bend in the up-down direction. However, the guiding direction is not limited to the up-down direction, and the guiding direction may be the left-right direction or another direction.

As illustrated in FIG. 9B, in the case in which the holding member 20 does not have the guiding part 25, the optical fiber (the short fiber 15) can bend inside the housing part 23 in various directions perpendicular to the front-rear direction, and in addition, for example, the bending direction can change from the up-down direction to the left-right direction. As a result, in the case in which the holding member 20 does not have the guiding part 25, there is a possibility that the load acting on the short fiber 15 which is bent inside the housing part 23 may be too large. In contrast, since in the modification example illustrated in FIG. 9A, the guiding part 25 is capable of restricting the bending direction of the short fiber 15 to the guiding direction, it is possible to makes the load acting on the short fiber 15 smaller than in the case of the holding member illustrated in FIG. 9B.

In addition, in the modification example, the holding part 21 has thick parts 21C. The thickness dimensions of the thick parts 21C in the radial directions are larger than the parts of the holding part 21 other than the thick parts 21C. As illustrated in FIG. 9A, the thick parts 21C are located in a direction intersecting the guiding direction. In this case, the thick parts 21C are located at the right and left parts of the holding part 21. Since the short fiber 15 does not bend in directions intersecting the guiding direction in the modification example, even though the thick parts 21C are located in directions intersecting the guiding direction, the thick parts 21C do not come into contact with the short fiber 15 (the thick parts 21C do not interfere with the short fiber 15). Note that as illustrated in FIG. 9B, in the case in which the holding member 20 does not include the guiding part 25, it is possible that the short fiber 15 may bend in various directions inside the housing part 23, the thick part 21C cannot be provided, and the thickness of the tubular holding part 21 is relatively thin along the entire circumference. In contrast, in the modification example, since the holding part 21 has the thick parts 21C, it is possible to make the strength of the holding part 21 larger than in the case of the holding part 21 illustrated in FIG. 9B.

In addition, in the modification example, the engagement parts 21A of the holding part 21 are provided in the thick parts 21C. Since the engagement part 21A has a shape of a window (hole), the strength of the parts of the holding part 21 where the engagement parts 21A are located tends to be small. However, in the modification example, since the engagement parts 21A are provided in the thick parts 21C, it is possible to prevent decrease in the strength of the holding part 21. In addition, in the modification example, since the engagement parts 21A are provided in the thick parts 21C, it is possible to prevent damage in the holding part 21 caused when the engagement parts 13B (the projected parts) of the ferrule 10 are engaged with the engagement parts 21A of the holding part 21 (see FIG. 7A).

Figure 11:
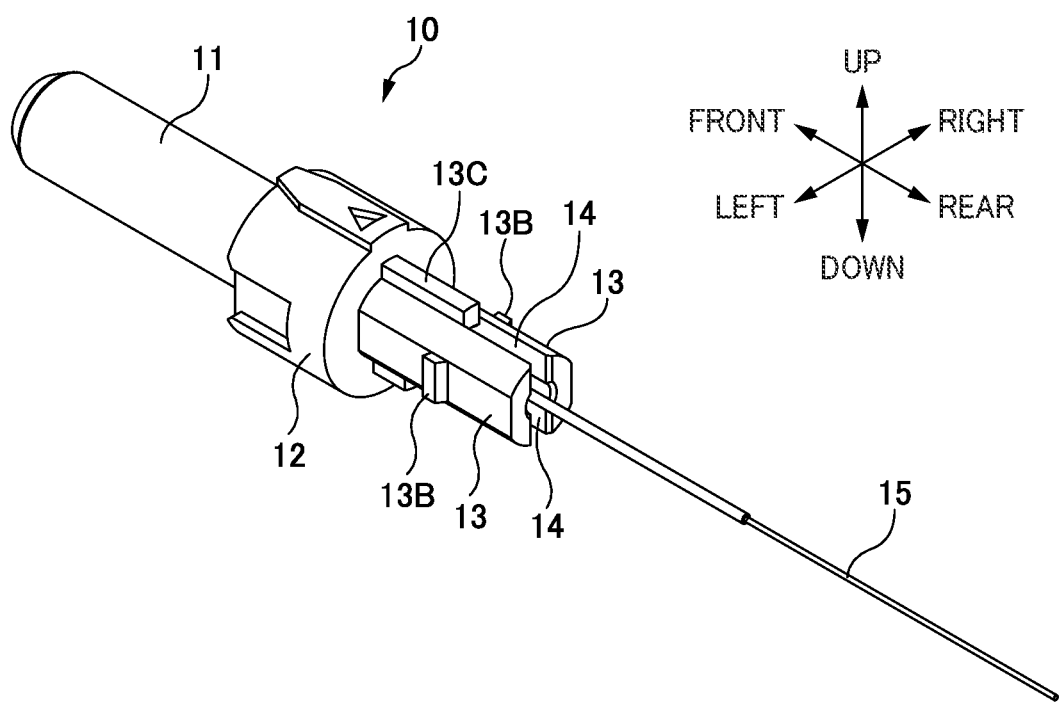
FIG. 11 is a perspective view of the ferrule of the modification example.

FIG. 11 is a perspective view of the ferrule 10 of the modification example. Also in the modification example, the ferrule 10 has a body part 11 and a flange part 12, and the flange part 12 has a protrusion part 13.

The protrusion part 13 of the modification example has a slit 14. The slit 14 is a part that enables the bent optical fiber (the bent short fiber 15) to move in. As illustrated in FIG. 10, when the short fiber 15 bends, the short fiber 15 moves into the slit 14. Since the protrusion part 13 has the slit 14, it is possible to prevent the bent short fiber 15 from interfering with the protrusion part 13. As already described, in the modification example, since the short fiber 15 bends in the guiding direction (in this case, in the up-down direction) due to the guiding part 25 of the holding member 20, the slit 14 is located at the parts of the protrusion part 13 in the guiding direction (in this case, in the up-down direction).

The protrusion part 13 of the modification example has larger thickness dimensions in the radial directions in the parts other than the slit 14 than the protrusion part 13 illustrated in FIG. 4. In the modification example, since the short fiber does not bend in the directions intersecting the guiding direction (in this case, the up-down direction), even though the thickness of the protrusion part 13 is large in directions intersecting the guiding direction, the inner wall surfaces of the protrusion part 13 do not interfere with the short fiber 15. In other words, even though the thickness of the protrusion part 13 is large, providing the slit 14 makes a sufficient space for the short fiber 15 to bend.

In the modification example, the protrusion part 13 is divided by the slit 14 into right and left two parts. With this configuration, even though the thickness dimensions of the protrusion part 13 are large in radius directions, the parts into which the protrusion part 13 is divided by the slit 14 have structures that enable those parts to elastically deform inward easily.

In addition, in the modification example, the side surfaces of the two parts into which the protrusion part 13 is divided by the slit 14 have the respective engagement parts 13B (projected parts, the engagement parts of the ferrule). Since the parts into which the protrusion part 13 is divided by the slit 14 are elastically deformed inward easily, it is easy in this structure to engage the engagement parts 13B on the side surfaces of the protrusion part 13 with the engagement parts 21A of the holding part 21. In addition, since the modification example has a structure in which it is easy to engage the engagement parts 13B of the protrusion part 13 with the engagement parts 21A of the holding part 21, and in which the holding part 21 and the protrusion part 13 have large thickness dimensions in radial directions, it is possible to synergistically provide the effect of preventing damage in the holding part 21 when the engagement parts 13B of the ferrule 10 are engaged with the engagement parts 21A of the holding part 21 (see FIG. 7A).

OTHER EMBODIMENTS

The above embodiments are intended to facilitate understanding of the present disclosure and is not intended to interpret the present disclosure in a limited manner. It goes without saying that the present disclosure can be changed and modified without departing from the gist thereof and that the present disclosure includes equivalents thereof.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 optical cord
5 optical fiber
10 ferrule
11 body part
12 flange part
13 protrusion part
13A insertion hole
13B engagement part
13C guiding part
14 slit
15 short fiber
20 holding member
21 holding part
21A engagement part
21B guiding part
21C thick part
22 fixing part
22A insertion hole
23 housing part
24 flange part
25 guiding part
30 spring
40 housing
41 rear housing
42 front housing
42A protruding part
43 coupling
43A key
50 boot
60 heat shrink sleeve
71 cap member
72 holder
100 optical connector

The invention claimed is:

1. An optical connector comprising:
a ferrule that holds an end part of a fiber;
a holding member including:
  a holding part that slidably holds the ferrule;
  a fixing part through which the fiber extending from the ferrule is inserted and to which a sleeve for protecting a fusion splice point between the fiber and an optical fiber is fixed; and
  a housing part that houses the fiber in a bent state between the holding part and the fixing part; and
a housing, including a front housing and a rear housing, that houses the ferrule and the holding member, wherein
the ferrule has a ferrule contact part that contacts the front housing,
the holding member has a holding contact part that contacts the rear housing, and
a dimension between the ferrule contact part and the holding contact part in an engagement state of the housing is shorter than a dimension between the ferrule contact part and the holding contact part in a disengagement state of the housing, wherein
  in the engagement state, the ferrule contacts the front housing, the holding member contacts the rear housing, and the fiber is bent, within the housing part, between the end part held by the ferrule and a part inserted in the fixing part of the holding member, and
  in the disengagement state, the ferrule does not contact the front housing, the holding member does not contact the rear housing, and the fiber is not bent.

2. The optical connector according to claim 1, further comprising:
a spring that is disposed outside the housing part and presses the ferrule.

3. The optical connector according to claim 2, wherein the holding member further includes a flange part that contacts an end part of the spring pressing the ferrule.

4. The optical connector according to claim 1, wherein the ferrule includes:
   a body part that holds the end part of the fiber,
   a flange part protruding from an outer periphery of the body part, and
   a protrusion part including a ferrule-side engagement part, and
   the holding part includes an engagement part with which the ferrule-side engagement part slidably engages.

5. The optical connector according to claim 1, wherein the holding member includes a guiding part that guides the fiber to bend in a specific direction.

6. The optical connector according to claim 5, wherein the holding part includes a thick part in a part in a direction intersecting the specific direction.

7. The optical connector according to claim 6, wherein the ferrule includes:
   a body part that holds the end part of the fiber,
   a flange part protruding from an outer periphery of the body part, and
   a protrusion part including a ferrule-side engagement part, and
   the thick part includes an engagement part with which the ferrule-side engagement part slidably engages.

8. The optical connector according to claim 7, wherein the protrusion part includes a slit extending in the specific direction.

9. The optical connector according to claim 8, wherein the protrusion part is divided two parts by the slit, and
   a side surface of each of the two parts has the ferrule-side engagement part.

* * * * *